US006094619A

United States Patent [19]
Noetinger et al.

[11] Patent Number: 6,094,619
[45] Date of Patent: Jul. 25, 2000

[54] METHOD FOR DETERMINING LARGE-SCALE REPRESENTATIVE HYDRAULIC PARAMETERS OF A FRACTURED MEDIUM

[75] Inventors: Benoît Noetinger, Guichenné; Thierry Estebenet, Route de Lourdes, both of France

[73] Assignee: Institut Francais du Petrole, Cedex, France

[21] Appl. No.: 09/109,543

[22] Filed: Jul. 2, 1998

[30] Foreign Application Priority Data

Jul. 4, 1997 [FR] France ................................. 97 08634

[51] Int. Cl.$^7$ ................................................. G06F 19/00
[52] U.S. Cl. ................................................................ 702/12
[58] Field of Search .................................. 702/12, 13, 16; 367/73, 72

[56] References Cited

FOREIGN PATENT DOCUMENTS 2725794  4/1996  France .
2725814  4/1996  France .
2733073  10/1996  France .

OTHER PUBLICATIONS

Warren & Root article entitled "The Behavior of Naturally Fractured Reservoirs", Society of Petroleum Engineers (SPE), vol. 3, 1963, Los Angeles, pp. 245–255, XP002058945.

F.M. Guehria et al, article entitled "Compositional Reservoir Simulation: a New, Efficient, Fully Integrated Solution Technique for the Flow/Thermodynamic Equilibrium Equations", Society of Petroleum Engineers Proceedings (SPE), Mar. 20, 1991, pp. 55–68, XP002035429.

*Primary Examiner*—Donald E. McElheny, Jr.
*Attorney, Agent, or Firm*—Antonelli, Terry, Stout & Kraus, LLP

[57] ABSTRACT

Method for determining, from a 3D image, the values of hydraulic parameters such as the large-scale equivalent permeability, the permeability of blocks and the matrix-fracture exchange coefficient α of a fractured porous medium such as a geologic formation. The method mainly comprises discretization of the medium by means of a grid pattern and fast and approximate solution, in this grid pattern, of equations modelling diffusion of the fluids in the medium, determination of the variation with time of a large-scale transfer function (f(t), f(s)) characterizing the fluid flows from the matrix to the fractures, by simulation of the movement of particles performing random walks in continuous time on said grid pattern and suitable processing of a state function (ε(τ)) indicative of the presence thereof either in the matrix or in a fracture. The method can be applied for large-scale modelling of fractured oil reservoirs allowing well test interpretation.

4 Claims, 3 Drawing Sheets

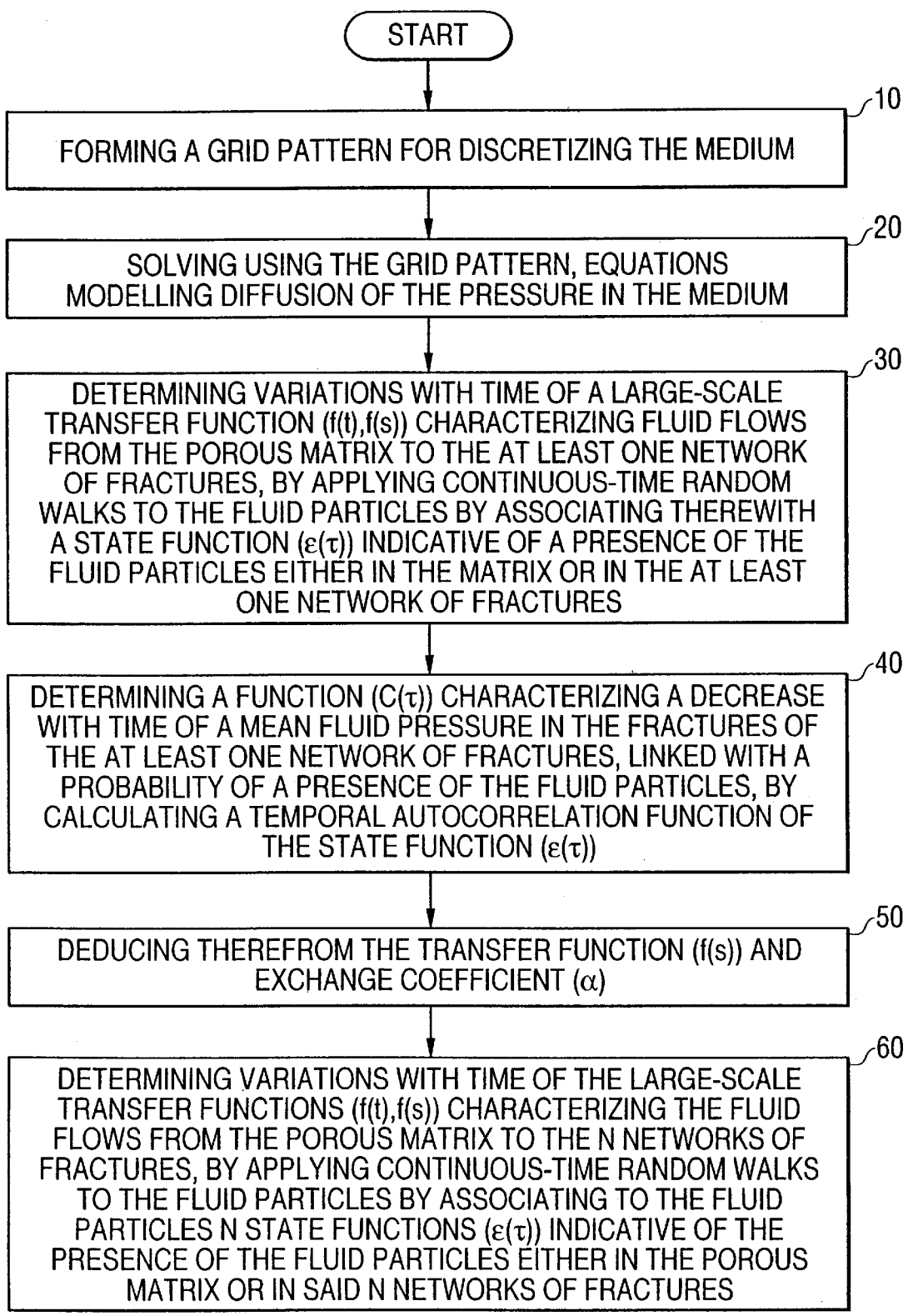

METHOD FOR DETERMINING LARGE-SCALE REPRESENTATIVE HYDRAULIC PARAMETERS OF A FRACTURED MEDIUM

BACKGROUND OF THE INVENTION

1. Field of the Invention

The present invention relates to a method for determining, from an image of a fractured medium such as, for example, a geologic formation crossed by a network of fractures, hydraulic parameters providing the best large-scale characterization possible thereof, i.e. the large-scale equivalent permeability, the permeability of blocks and the matrix-fracture exchange coefficient $\alpha$.

2. Description of the Prior Art.

Fractured reservoirs are commonly described as comprising two contrasting mediums, a matrix medium containing the largest part of the oil in place and having a low permeability, and a more or less complex, generally highly permeable medium with fractures characterized by the respective density, length, orientation, inclination and opening thereof.

In a single-phase context, the problem of small-scale well tests simulation is written in the form of a partial differential equation:

$$\varphi \mu c_1 \frac{\partial p(r;t)}{\partial t} = \nabla \cdot (k(r) \nabla P(r,t)) \qquad (1)$$

where p(r,t) denotes the value of the pressure at point r at the time t, $\mu$ is the viscosity of the fluid and $\phi$ the porosity, $c_t$ the total compressibility (rock+fluid) and k(r) the permeability. This equation is to be solved with boundary conditions and initial conditions suited to the N boreholes and to the reservoir boundaries so as to ensure the existence and the uniqueness of the solution thereof, by using as basic data a previously established permeability map k(r). The measurements obtained in the field are the N records of the pressures p($r_i$, t), i=1, N, and of the fluid flow rates in these N wells. The practical problem consists in finding information on the permeability map k(r) as a function of these N measurements. All the techniques used to that end are referred to as well test interpretation.

In order to establish such a map in the case of fractured reservoirs, modelling softwares are for example used which generate, from the information available on the medium: photographs, interpreted seismic data, geological surveys, measurements in wells drilled therethrough, core analyses, etc., spatial representations of the network of fractures included in a matrix that is itself permeable according to precise rules described for example in patents French Patents 2,725,795, 2,725,824 and 2,783,073 filed by the applicant. Since the zones of the reservoir around the wells are imperfectly known, these modelling softwares themselves use parameters that are not known well enough. Obtaining of this knowledge from well tests would therefore be desirable. In this fractured context, all the techniques used to that effect are referred to as interpretation of well tests in a fractured medium.

After using this type of modelling software, the oil reservoir $\Omega$ is partitioned into at least two subdomains $\Omega_f$ and $\Omega_m$ representing the fractures and the matrix respectively. The value of permeability k(r) is $k_f(r)$ if position r is in the fractures subdomain $\Omega_f$, and $k_m(r)$ otherwise, i.e. if r is in matrix $\Omega_m$. Generally, the permeabilities $k_f(r)$ of the fractures are much higher than those, $k_m(r)$, of the matrix: $k_f(r) \gg k_m(r)$.

Since the typical dimensions of the fractures (thickness of a few microns or more, very variable lengths) and their great density (several fractures per cubic meter of rock) preclude in practice the use of a fine-grid model for solving partial differential equation (1), it is usual in the petroleum sphere to consider a large-scale model as described for example by:

J. E. Warren & P. J. Root, The Behavior of Natural Fracture Reservoirs, The Society of Petroleum Engineers Journal 3, No. 3, 245–255, 1963.

According to this model, which is an idealization of reality, an elementary volume is represented as a set of identical parallelepipedic blocks limited by a network of continuous uniform orthogonal fractures oriented in the direction of one of the three principal axes. The fluid flow through the reservoir occurs through the fracture medium only and fluid exchanges appear locally between the fractures and the matrix blocks. The following equations are solved:

$$\phi \varphi_f c_t \frac{P_f(r,t)}{\partial t} = \nabla \cdot \left( \frac{K_f}{\mu} P_f(r,t) \right) + q_m(r,t) \qquad (2)$$

$$\phi \varphi_m c_f \frac{P_m(r,t)}{\partial t} = \nabla \cdot \left( \frac{K_m}{\mu} P_m(r,t) \right) - q_m(r,t)$$

Pressures $P_m$ and $P_f$ are large-scale mean values of the pressures in the matrix and in the fracture. Coefficients $K_m$ and $K_f$ represent the large-scale equivalent permeabilities of the matrix and of the network of fractures. Quantities $\phi_f$ and $\phi_m$ denote the volume proportions of fractures and of the matrix. We have of course the following relation: $\phi_f + \phi_m = 1$. Term $q_m(r,t)$ represents a source term of exchange between the two pressures which, in the "pseudosteady" case, is written as follows:

$$q_m(r,t) = \frac{\alpha K_m}{\mu} (P_m(r,t) - P_f(r,t)) \qquad (3)$$

This term represents the mass exchange between the two mediums, which justifies the name "term of exchange" and the name "exchange coefficient" applied to $\alpha$. It can be noted that quantity $\alpha K_m / \phi \mu c_t$ is homogeneous to the inverse of a time.

It is essential to understand that, at the scale considered, individual fractures have disappeared from the description. In particular, parameters $K_m$, $K_f$ and $\alpha$ are generally independent of the point r considered, and details of the properties of the network of fractures appear only via the value of the parameters.

The physical idea at the root of the present modelling is to consider that the fluid stored in the matrix moves towards the wells via the network of fractures. In the case of a medium consisting of cubic matrix blocks of side L separated by fractures, $\alpha$ is of the order of $1/L^2$, whence the expression "equivalent block size" that is sometimes encountered to designate this coefficient. Other more complex representations of term $q_m(r,t)$ exist in the form of temporal convolutions and are referred to as "transient models".

This formulation, notably known from Warren et al, mentioned above, when it is extended to multiphase flows, represents what is referred to as a "double medium" description. It serves as a basis for all the simulations of flows in fractured reservoirs that are usually performed in the petroleum sphere. In the particular case of single-phase well tests, knowledge of the analytical solutions to Eqs.(2) allows to adjust the parameters from the pressure variations observed in the well(s). In particular, if the well has a radius $r_w$, coefficient $\lambda = \alpha K_m(L/r_w)^2$ is conventionally introduced. In practice, correct adjustments are obtained for well tests, but if it is desired to adjust the description to the field scale, other values can be found for the coefficients.

This model, whose great quality lies in the simplicity thereof, has a great deficiency: parameters $K_m$, $K_f$ and $\alpha$ are a priori phenomenological and adjustable. Their relation with the detailed structure of the medium and the flow process is not widely known and few efficient computing tools are available.

Calculation of these parameters requires scaling of the detailed description of the medium. For example:

Quintard M et al, One- and Two-Equation Models for Transient Diffusion Processes in Two-Phase Systems, Advances in Heat Transfer, 23, 369–464, 1993 describes a method allowing obtaining the value of these parameters which comprises solving three "closing problems" defined on a representative portion of the medium. Calculation however requires solving stationary boundary value problems, which requires fine-grid representations of the reservoir. The notion of representative volume is delicate and the practical determination thereof is unknown. Furthermore, the computing cost of these methods becomes large when the network of fractures is complex because they do not spare the necessity of solving large-size linear systems (several million unknowns) if several thousand fractures are to be properly represented.

A technique referred to as "random walk" technique is used to determine the permeability variations of the homogeneous and heterogeneous medium. It is notably described by:

McCarthy J. F., Continuous-time Random Walks on Random Media, J. Phys. A: Math. Gen. 26, 2495–2503, 1993.

The principle of the random walk technique follows: a certain number of independent fluid particles initially placed on certain grids of a regular grid pattern discretizing the medium studied is considered, and the displacement thereof on the neighbouring grids is studied with a weighted equal probability in order to take account of the medium heterogeneities. Return to a global vision of the medium is performed by calculating the average of the squares of the displacements of all these particles. It is supposed that the problem of the solution of Eq.(1) has been previously discretized by means of a finite-difference or a finite-element method with a regular spatial grid pattern of N grids. The discretized equations are written as follows:

$$V_i \varphi \mu c_t = \frac{dP_i(t)}{dt} = \sum_{mj} T_{ij}(P_j(t) - P_i(t)) \quad (4)$$

$$\text{avec} \frac{1}{T_{ij}} = \frac{1}{k_i} + \frac{1}{k_j}$$

where mj denotes the grids next to grid i.

The N quantities $P_i(t)$ thus represent the pressure evaluated at the center of the N nodes. Coefficients $T_{ij}$ are the transmissivities between grids i and j, and they are given by the permeability harmonic means $k_i$ and $k_j$ of the two grids considered. The heterogeneous or fractured nature of the medium is thus taken into account via the values of these transmissivities. Coefficient $V_i = (\Delta X)^D$ is the volume of the grids which is assumed not to depend on i (regular grid pattern hypothesis).

The random walk is considered when as follows. At the initial time t=0 ("zero" iteration, k=0), a grid with subscript $i_0$ is taken at random and it is assumed that a particle is released therein. At the iteration k of the algorithm, it is assumed that the particle has reached the grid marked by subscript $i_k$, and that the time is $t_k$. In order to find its position $i_k+1$ at iteration k+1, a grid next to $i_k$ and bearing subscript j is selected at random with the following probability:

$$b_{i_k \to j} = \frac{T_{i_k j}}{\sum_j T_{i_k j}} \quad (5)$$

The sum on subscript j concerns the same neighbouring grids as in Eq.(4). The probabilities b are normalized, the value of their sum being 1 by construction. The particle has to jump from one site to the other without it being possible for it to remain on the spot. In the particular case where the particle is on a site at the border of the domain, the periodic boundary conditions are used: everything goes off as if the particle could "go out" of the medium and return thereto on the other side (the absolute position thereof being however kept).

This selection being made, the position $i_{k+1}$ at iteration k+1 is known, and the timer is then incremented as follows:

$$t_{k+1} = t_k - \frac{\varphi \mu c_t (\Delta x)^2}{\sum_j T_{i_k j}} \text{Ln}(\text{ran}(k+1)) \quad (6)$$

where ran(k+1) is a random number of uniform law on interval (0, 1). The logarithm still being negative, the timer increases with subscript k. $\Delta X$ is the spatial pitch of the grid pattern. The quantity factorized is homogeneous to a time and represents a typical diffusion time over the distance $\Delta X$. The increase of the timer corresponds to the distribution of the residence times of a particle on the grid considered.

The process can now be iterated and it is stopped when the time $t_k$ exceeds a set value $T_{max}$ set by the user.

A random path or walk thus consists of a table (of displacements) of size $K(T_{max})$ (size depending on the realization) comprising the values of $K(T_{max})$ positions $i_k$ and of $K(T_{max})$ associated times $t_k$.

Consider now a great number of such independent random walks (or paths), therefore Q lists of positions and times. The probability for a particle of being on grid i between t and t+dt defines a probability density $P_i(t)$ which could be calculated by means of a very great number of walks.

It can be demonstrated that all of the densities $P_i(t)$ follow Eqs. (5). In the case considered, where the particles start at t=0 from a random site of the network, the initial condition is $P_i(t=0)=1/N$. If it is decided to always start from the same site $i_0$, at t=0 we would have $P_i(t=0)=\delta i\,i_0$, where $\delta$ is the Kroenecker symbol. The discrete Green function of the problem is obtained, i.e. the probability of being on grid "i" at the time t, knowing that we were on grid $i_0$ at the time t=0.

This type of displacement is referred to as "continuous-time random walk" (CTRW). It is the apparently complex management of the time interval (Eq.(6)) which allows the particles to move at each interval without ever pausing on a grid and precision obtaining of good numerical performances (since each pause would correspond to numerical iterations and therefore to unnecessarily spent computer time).

SUMMARY OF THE INVENTION

The method according to the invention avoids the aforementioned drawbacks of prior methods because it does not require a complete solution of very large-size linear systems by means of a statistical definition of the large-scale parameters. From an image of a geologic formation crossed by at least one network of fractures, the method allows determination of hydraulic parameters of the geologic formation such as, notably, the matrix-fracture network exchange coefficient (α), in order to interpret well tests.

The method according to the invention finds applications notably in the sphere of petroleum production where modelling of the behavior of a reservoir is sought in order to obtain reliable hydrocarbon production predictions. Knowledge of these parameters is important because it allows performing simulations of complex flows in the medium and inversion of data obtained in well tests which, in return, allow improvement of the geologic/petrophysical image of the medium and eventually, by simulation, optimization of the further exploitation of the reservoir. The method according to the invention is also suitable in hydrogeology.

Despite uncertainties concerning the exact structure of the fractured medium and the incomplete nature of the large-scale description of the flows (Eqs.(2)), which make it impossible to determine the complete solution on all the grids of the fine model, the method however allows obtaining of a correct value for the large-scale equivalent permeabilities (Km, Kf) of the matrix and of the fractures, as well as exchange coefficient (α). Furthermore, it provides information on the transient state.

The method comprises discretization of the medium by means of a grid pattern and probabilistic (Monte-Carlo type) solution, in this grid pattern, of equations modelling the diffusion of pressure in the medium. The method comprises determining the variation with time of a large-scale transfer function (f(t)) or (f(s)) (s being Laplace's parameter) characterizing the flows of fluid from the matrix to the network of fractures, by applying to the fluid particles continuous-time random displacements by associating therewith a state function ($\epsilon(\tau)$) indicative of the presence thereof either in the matrix or in said network of fractures.

The method can comprise for example determining a function ($C(\tau)$) characterizing the decrease with time of the mean fluid pressure in the fractures, connected with the probability of presence of the particles, by a temporal autocorrelation of the state function, from which the transfer function (f(s)) and exchange coefficient (α) are deduced by means of a numerical quadrature formula.

Knowledge of these parameters obtained by means of the method according to the invention then allows performing of simulations of complex flows on this medium and well test data inversions which will give, in return, a better geologic/petrophysical image. The technique used avoids any linear system solution and therefore performing of calculations on ultrahigh-resolution grid patterns which cannot be managed by means of conventional methods in the present state of the computing capacities.

A means to specify the flow regimes, pseudosteady or transient state, in the medium is furthermore obtained as the explicit form of the transfer functions is obtained in both cases. In fact, the method allows obtaining, besides the exchange coefficient α, the variations with time of transfer function f(t) (or f(s) in Laplace representation) characterizing the fluid flows from the matrix to the fractures and therefore treatment the transient cases.

BRIEF DESCRIPTION OF THE DRAWINGS

Other features and advantages of the method according to the invention will be clear from reading the description hereafter of a non limitative example, with reference to the accompanying drawings wherein:

FIG. 4 is a flow chart of the method of the present invention.

DESCRIPTION OF THE INVENTION

The method comprises discretizing the fractured heterogeneous medium by means of a sufficiently fine cartesian grid pattern. It is considered that any grid "i" is a "fracture" grid if the center thereof is in a fracture, and otherwise a "matrix" grid. Any grid is therefore associated with a scalar $\epsilon(i)$ such that $\epsilon(i)=1$ if grid "i" is on a fracture, and $\epsilon(i)=0$ otherwise.

If the medium is sufficiently discretized, the proportion of fracture grids is:

$$\phi_f = \frac{\text{volume occupied by the fractures}}{\text{total volume}}, \text{ i.e.}: \sum_{i=1}^{N} \varepsilon(i)/N = \phi_f \quad (7)$$

Figure 1:
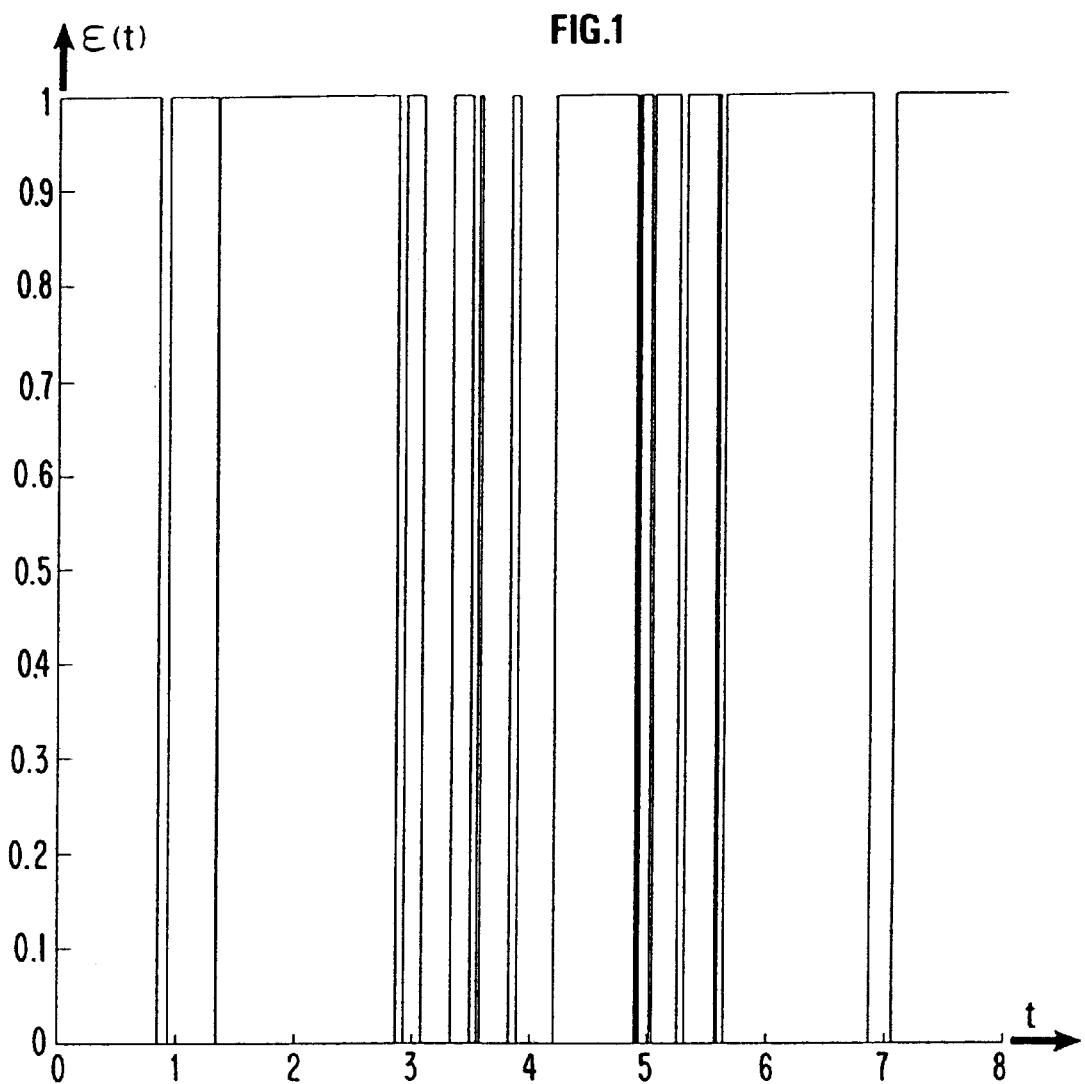
FIG. 1 shows an example of variation with time of a function $\epsilon(t)$ which accounts for the position of a fluid particle either in the matrix or in a fracture.

The technique referred to as the "random walk" technique is applied to a fluid particle. The position $i_k$ of the particle is known at any time $t_k$ and the value $\epsilon(t_k)=\epsilon(i_k)$ can thus be associated with $t_k$. This number indicates if, at the time $t_k$, the particle is in a fracture or not. By construction, the value of this function is zero or 1, and it is artificially extended in the interval between $t_k$ and $t_{k+1}$ by its value at the time $t_k$. As shown in the example of FIG. 1, a definite function is thus obtained on the real half line, which can be readily defined univocally and coded by retaining the initial state of the particle and the dates of the changes of medium thereof.

Consider now the following function $C(\tau)=<\epsilon(t)\ \epsilon(t+\tau)>$, where the terms between square brackets correspond to an average for all the possible walks. It can be noted that argument t is not involved in function C. This is due to the fact that the position of the particle at t+τ, once known at the time t, does not depend on its path at the times prior to t.

Function $C(\tau)$ is none other than the autocorrelation function of the presence of the particle in the fractures: it describes the probability density of being in a fracture both at the time t and at the next time (t+τ).

It has the simple properties as follows:

$$C(\tau=0)=<\epsilon(t)\epsilon(t)>=<\epsilon(t)>(\text{because}\epsilon(t)^2=\epsilon(t))$$

This average is none other than the probability for the particle of being in a fracture at the time t, i.e. the proportion $\phi_f$, therefore:

$$C(\tau=0)=\phi_f \quad (8)$$

$C(\tau=\infty)=\text{Lim }(\tau\to\infty)\ (<\epsilon(t)\ \epsilon(t+\tau)>=<\epsilon(t)><\epsilon(t+\tau)>=\phi_f^2$
(because the positions of the particle are independent if τ is great enough), i.e.

$$C(\tau=\infty)=\phi_f^2 \quad (9)$$

It is simpler to consider the normalized function $\underline{C}(\tau)$ ranging from 1 to 0, which is written as follows:

$$\underline{C}(\tau)=(C(\tau)-\phi_f^2)/\phi_f(1-\phi_f)=(C(\tau)-\phi_f^2)/\phi_f\phi_m \quad (10)$$

By using now the conditional probabilities, $C(\tau)$ is written in the following form:

$C(\tau)=<\epsilon(t)\epsilon(t+\tau)>_{\epsilon(t)=1}<\epsilon(t)>$, where subscript $\epsilon(t)=1$ indicates that $\epsilon(t)=1$ at t is known. Since $<\epsilon(t)>=\phi_f$ corresponds to the probability, for the particle, of being in a fracture at the time t, function $C(\tau)/\phi_f$ is none other than the probability of finding the particle in a fracture at the time $\tau$, knowing that it was there at the time 0 (this new interpretation also allows to very readily find the two previous limits).

The latter function has an interpretation in terms of solution to partial differential equation (1). The pressure P(r, t) is to be found with the following initial condition:

P(r, t=0)=1 if r is in a fracture, or

P(r, t=0)=0 otherwise.

These first two conditions are the expression of the condition: the particle is in the fractures at the initial time 0.

$$\text{We then have: } C(t) = \int_{\text{fissures}} P(r,\tau)dr \tag{11}$$

Physically, this problem amounts to setting the whole of the fractured zone to the potential 1 when t=0, the matrix being at the zero potential, and thereafter to letting the pressure diffuse according to Eq.(1). Function C characterizes the mean pressure decrease in the fractures, which explains why knowledge of function C gives information about the transfer function (matrix to fractures), and corresponds in the particulate image to the fraction of the total number of particles in the fractures at the time t.

As explained hereafter, it is possible to calculate function $C(\tau)$ from the carrying out of a single random process. The ergodicity of the random paths is used to that effect, which allows to write the following equality:

$$C(t) = \text{Lim}(t_{\max} \to \infty) \int_0^{t_{\max}-\tau} \frac{\epsilon(t)\epsilon(t+\tau)dt}{t_{\max}-\tau} \tag{12}$$

Evaluation on a Single Path of Function $\epsilon(t)$

Evaluation of the integral is easy knowing that the value of $\epsilon(t)$ is zero or 1, and it corresponds to the evaluation of the product of function $\epsilon(t)$ and of the function translated by $\tau$. Since function $\epsilon(t)$ is defined by the table of dates when the particle has changed medium, if ti ti+1 corresponds to an interval where the value of $\epsilon(t)$ is 1 (every other interval), it is sufficient to calculate the following integral:

$$\int_{t_i}^{t_{i+1}} \epsilon(t+\tau)dt$$

which amounts to evaluating the times of change of state of function $\epsilon(t+\tau)$ in the interval considered.

The whole of the calculation for an arbitrary number of values of $\tau$ can be carried out rapidly by means of programming of a well-known type.

Figure 2:
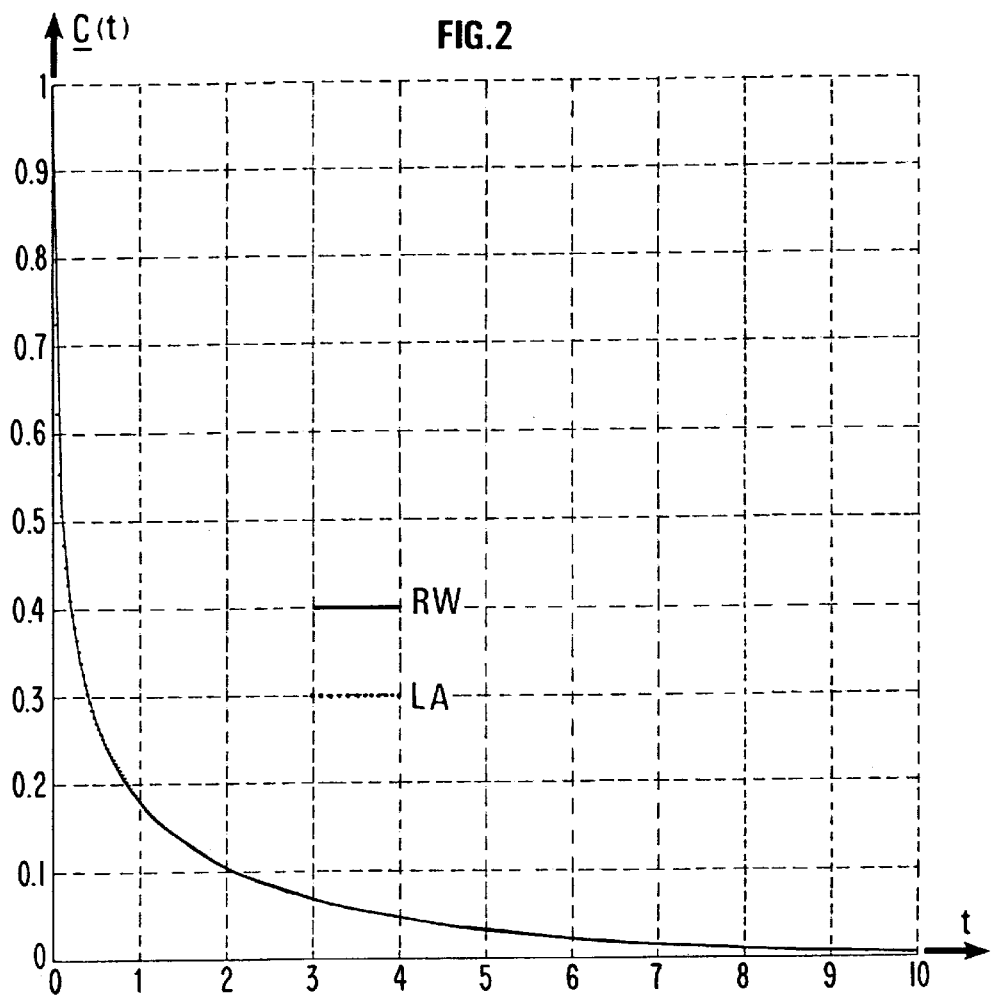
FIG. 2 shows the compared variations of a normalized function C(t), the results being obtained with the method according to the invention and with an analytical method.
Figure 3:
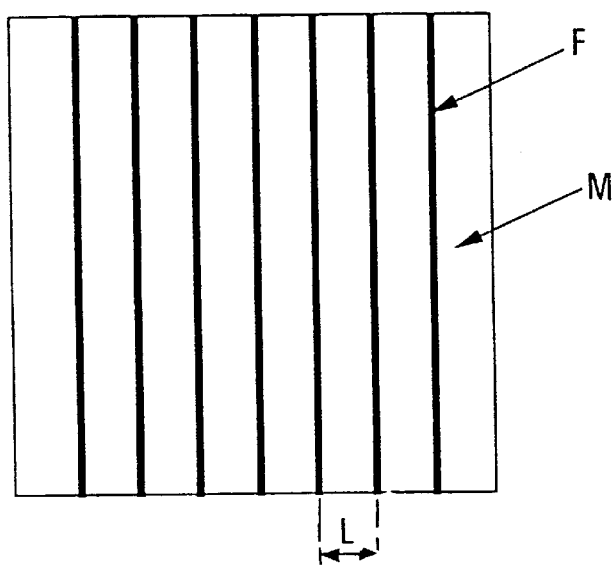
FIG. 3 is a shematic of a "foliated" type fractured medium.

An example of normalized function $\underline{C}(t)$ is shown in FIG. 2. The medium considered is a foliated medium consisting of plane fractures spaced out by a distance L (FIG. 3).

It is now possible to establish a connection with Warren and Root's transient system of equations (2), with the following initial condition:

$P_f(r, t=0)=1$ $P_m(r, t=0)=0$ otherwise, where $P_m$ and $P_f$ correspond to "large-scale" pressures which are the averages of the pressures in the matrix and in the fractures.

Integration of this system with respect to variable r on the whole medium allows the obtaining of a differential system describing the mean pressure variations in the fractures and the matrix, which is written as follows:

$$\phi\phi_f c_t \frac{dP_f(t)}{dt} = \int dr q_m(r,t) \tag{13}$$

$$\phi\phi_f c_t \frac{dP_m(t)}{dt} = \int dr q_m(r,t)$$

In terms of particles, these quantities $P_f(t)$ and $P_m(t)$ correspond to the number of particles in each one of the two regions.

In the transient model, the source term $q_m(r, t)$ is related to $P_f(r, t)$ by a temporal convolution $q_m(r, t)=G_m(t) * P_f(r, t)$, the underlying hypothesis being that the flow of exchange at one point only depends on the value of $P_f(r, t)$ at this point. After integration, it is obtained:

$$\phi\phi_f c_t \frac{dP_f(t)}{dt} = G_m(t) * P_f(t) \tag{14}$$

$$\phi\phi_m c_t \frac{dP_m(t)}{dt} = -G_m(t) * P_f(t)$$

This system can now be integrated by means of a Laplace transformation:

$$g(s) = \int_0^\infty e^{-st} g(t) dt \tag{15}$$

It is found:

$$P_f(s) = \frac{\Phi_f}{sf(s)} \tag{16}$$

with s f(s)=s $\phi_f - G_m(s)$.

For Warren and Root's quasi-steady model, the known expression for function f(s) is:

$$f(s) = \frac{\Phi_f \Phi_m s + \alpha D_m}{\Phi_m s + \alpha D_m} \tag{17}$$

with $D_m = K_m/\phi\mu c_t$.

In this particular case, function $P_f(t)$ is a decreasing exponential with a relaxation time.

$$\frac{\phi_f \phi_m}{\alpha D_m}.$$

This time corresponds to the typical pressure balancing time in the medium and it is of the order of the typical diffusion time of a particle on a matrix block according to estimations of $\alpha$.

This function, which ranges from 1 to $\phi_f$ when s covers interval $(0,\infty)$ (or from $\phi_f$ to 1 when t ranges from 0 to $\infty$), represents an "effective porosity". It can generally be demonstrated that the solution, in the Laplace space, to the well tests in a fractured medium is deduced from "simple medium" solutions by replacing argument s by s f(s).

It is shown that, for a more general exchange term model that cannot be reduced to the simple pressure difference (3), mere knowledge of function f(s) is sufficient. This function has been analytically calculated for some simple geometries (foliation, spheres), as described by:

A. de Swaan O., Analytic solutions for determining naturally fractured reservoir properties by well testing, trans. AIME, 1976.

Using Eqs. (10), (11) with result (16), we have:

$$\underline{C}(s) = \frac{\Phi_f}{s\Phi_m}\left(\frac{1}{f(s)} - 1\right) \quad (18)$$

This means that knowledge of C(t) (and therefore of C(s)) allows to determine f(s).

Determination of Coefficient α

To determine α, we will use a limited development of $\underline{C}(s)$ about s=0 is used using the form (17) of f(s). We have:

$$\underline{C}(s=0) = \frac{\phi_f \phi_m}{\alpha D_m} \quad (19)$$

This property, checked here in the pseudo-steady case, is also exact in transient cases by using the formulas given by A. de Swaan. It corresponds to a "long-time" approximation corresponding to the small s limit. Now, with long-time approximations, the quasi-steady model is asymptotically exact, hence the general nature of this result. Since, by definition of the Laplace transformation, it is obtained:

$$\underline{C}(s) = \int_0^\infty \underline{C}(t) dt,$$

and finally it is obtained:

$$\alpha = \frac{\Phi_m \Phi_f}{D_m \int_0^\infty \underline{C}(t) dt} \quad (20)$$

As the random walk method allows the calculation of $\underline{C}(t)$, a numerical quadrature allows to trace α by means of this relation.

Validation and Tests

Consider a "foliated" medium (FIG. 3) where the fractures F are assumed to be parallel planes evenly spaced out by a distance L in a matrix M. In this case, it is show that $$\alpha = \frac{12}{L^2}.$$

In order to implement the random walk method, we consider an elementary cell of size L=1 is considered, assumed to be gridded 10 by 10, the grids of the first row of grids being assumed to be fracture grids. Therefore $\phi_f$=0,1 and a permeability contrast of 100 has been taken between the fractures and the matrix.

The same graph shows the variations of function $\underline{C}(t)$ obtained by means of a software implementing the method (curve RW) and by means of a Laplace inversion of relation (18) (curve LA) using the analytical formula defined in de Swaan's article mentioned above, valid for the foliations, by taking $$\alpha = \frac{12}{L^2},$$

i.e. 12 here. An excellent agreement can be observed between the two curves. The coefficients α have been calculated with formula (20) by means of a numerical quadrature, and the values thereof are shown in the graph. The error that may have been noted concerning the value of these obtained coefficients with the method is of the same order as that resulting from the exact solution. It is therefore a priori imputable to the numerical quadrature procedure itself.

FIG. 4 illustrates a flow diagram of a method for modelling, from a 3D image of a fractured medium such as a geological formation consisting of a porous matrix crossed by at least one network of fractures, hydraulic parameters providing a best large-scale characterization possible of the fractured medium, in order to interpret well tests. The method of the invention initially starts with forming a grid pattern for discretizing the medium as illustrated in step 10. The method proceeds to step 20 where solving using the grid pattern, equations, modeling diffusion of the pressure in the medium occurs. The method proceeds to step 30 where determining variations with time of a large-scale transfer function (f(t), f(s)) characterizing fluid flows from the porous matrix to the at least one network of fractures, by applying continuous-time walks to the fluid particles by associating therewith a state function ($\epsilon(\tau)$) indicative of a presence of the fluid particles either in the matrix or in the at least one network of fractures occurs. Furthermore, as illustrated at step 40, determining a function ((C)τ) characterizing a decrease with time of a mean fluid pressure in the fractures of the at least one network of fractures, linked with a probability of a presence of the fluid particles, by calculating a temporal autocorrelation function of the state function ($\epsilon$)τ))occurs. Furthermore, as illustrated at step 50, deducing therefrom the transfer functions (f(s)) and exchange coefficient (α) occurs. Finally, as illustrated at step 60, wherein the medium includes N(N≧1) networks or fractures, determining variations with time of the large-scale functions (f(t), f(s)) characterizing the fluid flows from the porous matrix to the N networks of fractures, by applying continuous-time random walks to the fluid particles by associating to the fluid particles N state functions ($\epsilon(\tau)$) indicative of the presence of the fluid particles either in the porous matrix or in said N networks of fractures occurs.

Without departing from the scope of the invention, the method that has been described can be applied to a medium crossed by a number N (N≧1) of different networks of fractures with which N state functions $\epsilon_N(\tau)$ would be respectively associated.

What is claimed is:

1. A method for modelling, from a 3D image of a fractured medium such as a geologic formation consisting of a porous matrix crossed by at least one network of fractures, hydraulic parameters providing a best large-scale characterization possible of the fractured medium, in order to interpret well tests, comprising:

forming a grid pattern for discretizing the medium;

solving using the grid pattern, equations modelling diffusion of the pressure in the medium; and determining variations with time of a large-scale transfer function (f(t), f(s)) characterizing fluid flows from the porous matrix to the at least one network of fractures, by applying continuous-time random walks to the fluid particles by associating therewith a state function ($\epsilon(\tau)$) indicative of a presence of the fluid particles either in the matrix or in the at least one network of fractures.

2. A method as claimed in claim 1, comprising:

determining a function (C(τ)) characterizing a decrease with time of a mean fluid pressure in the fractures of the at least one network of fractures, linked with a probability of a presence of the fluid particles, by calculating a temporal autocorrelation function of the state function ($\epsilon(\tau)$); and deducing therefrom the transfer function (f(s)) and exchange coefficient (α).

3. A method as claimed in claim 1, wherein the medium includes N(N≧1) networks of fractures further comprising:

determining variations with time of the large-scale transfer functions (f(t), f(s)) characterizing the fluid flows from the porous matrix to the N networks of fractures, by applying continuous-time random walks to the fluid particles by associating to the fluid particles N state functions ($\epsilon(\tau)$) indicative of the presence of the fluid particles either in the porous matrix or in said N networks of fractures.

4. A method as claimed in claim 2, comprising, the medium including N(N≧1) networks of fractures:

determining variations with time of the large-scale transfer functions (f(t), f(s)) characterizing the fluid flows from the porous matrix to the N networks of fractures, by applying continuous-time random walks to the fluid particles by associating to the fluid particles N state functions ($\epsilon(\tau)$) indicative of the presence of the fluid particles either in the porous matrix or in said N networks of fractures.

* * * * *